Feb. 6, 1951 M. V. LONG 2,540,588
MAGNETIC TESTING DEVICE
Filed Oct. 13, 1947 2 Sheets-Sheet 1

Inventor: Marion V. Long
By his Attorney:

Feb. 6, 1951　　　　　M. V. LONG　　　　　2,540,588
MAGNETIC TESTING DEVICE

Filed Oct. 13, 1947　　　　　　　　　　　　　2 Sheets-Sheet 2

Inventor: Marion V. Long
By his Attorney:

Patented Feb. 6, 1951

2,540,588

UNITED STATES PATENT OFFICE 2,540,588

MAGNETIC TESTING DEVICE

Marion V. Long, Berkeley, Calif., assignor to Shell Development Company, San Francisco, Calif., a corporation of Delaware Application October 13, 1947, Serial No. 779,495

10 Claims. (Cl. 175—183)

This invention relates to an apparatus for magnetically detecting and recording flaws and variations in the wall thickness of metallic members such as rails, structural steel elements, plates, and particularly metallic tubular elements, such for example as boiler and condenser tubes, etc.

Wall thickness variations may be encountered in such metallic members either by reason of the specific design of said members, or by reason of outside causes such as wear, corrosion, pitting, flaws, dezincification, etc.

Magnetic systems especially suitable for testing metallic members for weaknesses due to flaws, cracks, pits, etc., have been described in copending applications Ser. No. 554,826, filed September 19, 1944, now abandoned, and Ser. No. 692,485, filed August 23, 1946, now abandoned.

It is the object of the present invention to provide an improvement to the systems described in the above-mentioned applications, whereby members under test may be examined not only with regard to individual flaws, cracks or pits, but also with regard to the presence and location of relatively extended areas wherein the thickness of said members has a decreased or increased value.

It is also an object of this invention to provide an apparatus capable of furnishing a complete and accurate record of the relative thickness of the member under test throughout its length in such a manner that thickness variations due to the structural characteristics of said member will appear on the record as definite reference points for a ready determination of the exact location of flaws, cracks, pits and other thickness variations due to extraneous causes, such as corrosion, dezincification, etc.

These and other objects of this invention will be understood from the following description taken with reference to the attached drawings wherein.

This invention will be described for simplicity with regard to a magnetic testing system similar to that of the applications mentioned hereinabove, that is, to a system wherein a tubular member is tested by means of axially spaced probe coils insertable thereinto. It is however understood that the present invention is equally well suited for use in magnetic testing systems involving other types of probing elements, such as coils positioned around the element under test or adjacent to said element and movable with regard thereto, the present invention being therefore not limited by said description, but only by the scope of the claims appended hereto.

Figure 1:
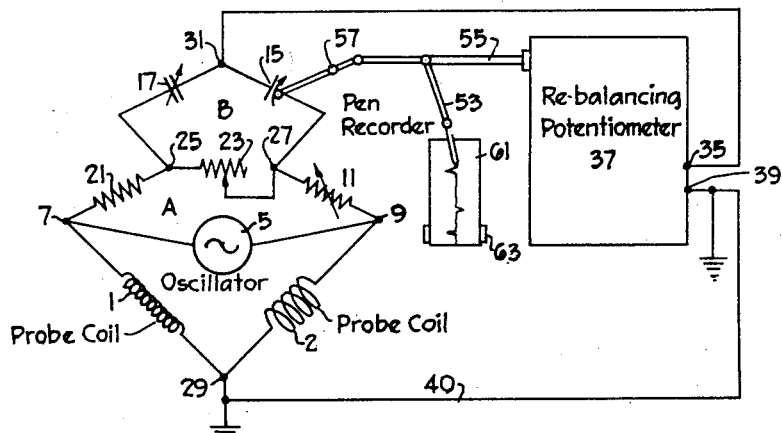
Fig. 1 is a diagrammatic view of the general arrangement of parts and electrical circuits of the present invention.

Referring to Fig. 1, the present magnetic testing system comprises an alternating current supply source 5 which may be of the variable frequency type, such, for example, as an electronic audio frequency oscillator having a range from about 20 to 20,000 cycles per second.

The output terminals of the power supply source 5 are connected at 7 and 9 to a measuring bridge circuit whose input impedance should generally match or be greater than the output impedance of the supply source.

The measuring bridge circuit may preferably be a compound or double bridge of a type comprising a main bridge A and an auxiliary bridge B. The probe coils 1 and 2, to be described hereinbelow, are connected to form two arms of the main bridge A. The other two arms of bridge A are formed by variable impedance, reactance or resistance means shown by elements 21, 23 and 11, one of said arms comprising, for example, resistance 21 and an adjacent portion of the intermediate resistance 23, and the other arm comprising variable resistance 11. The apparent or effective point of division of resistance 23 between said two arms is at that point on resistance 23 which has the same potential as point 29 intermediate the two coils 1 and 2. The resistance 23 or a desired portion thereof is also connected to form an arm of an auxiliary bridge B. Impedance or reactance means, such for example as a condenser 17, which may be variable, and a variable condenser 15, having a movable, automatically adjustable element such as one or a plurality of plates, form the other arms of the auxiliary bridge B, being connected across the resistance 23 at points 25 and 27.

It may be considered that any condition of unbalance between coils 1 and 2 will result in a shift of the balance or division point on resistance 23. This will produce an unbalance potential between points 31 and 29. This unbalance potential is amplified and used to readjust condenser 15 to balance the bridge B as will be described hereinbelow. This readjustment of balance in bridge B is accomplished by an adjustment of the condenser 15 in such a direction as to make the ratio of any potentials across condensers 15 and 17, forming two arms of the bridge B, equal to the ratio of the potentials across the corresponding adjacent sections of resistor 23, forming the other two arms of bridge B.

Resistor 23 is made variable in order to permit the adjustment of the system sensitivity for a given unbalance between coils 1 and 2. It will be seen that, for a given unbalance between coils 1 and 2, the balance point on resistor 23 will move a small percentage of the total value of resistor 23 when said value is relatively large, and a large percentage of the total value of resistor 23 when said value is relatively small. This will require condenser 15 to change its value a correspondingly small or large amount in order to rebalance bridge B, whereby the system can be readily adjusted to any desired range of sensitivity by a proper manipulation of the variable resistance 23.

It is evident that since the variable condensers shown in the bridge circuit are used as means for vectorially balancing the bridge against impedance changes, variable inductances can be readily substituted for the same purpose. Condensers are however preferred because of the ease with which their settings can be adjusted and varied.

The measuring bridge circuit is connected, at points 31 and 29, to the input terminals 35 and 39 of an automatic re-balancing potentiometer unit, which in itself forms no part of this invention and is therefore shown in the form of a block diagram at 37. This unit comprises the usual pre-amplifier, galvanometer, amplifier, discriminator and motor circuits, whereby a bridge unbalance voltage appearing between terminals 35 and 39 is utilized to cause a mechanical motion of an element such as an arm 55, which resets, for example, through a pivoted linkage 57, the movable element or plate of condenser 15, and thus rebalances the bridge to a new condition of voltage equilibrium between points 31 and 29. At the same time, a marking element such as a stylus or pen 53, mechanically linked to the arm 55, records this change in the balance conditions of the bridge on a time or probe-motion responsive chart element 61 driven by a mechanism 63 of the clock-work or any other desired type.

Figure 2:
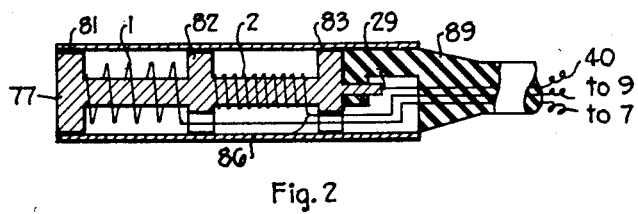
Fig. 2 is a diagrammatic cross-section view of the probe element of the present invention.

The probe coils 1 and 2, forming the particular subject of the present invention, are shown in Fig. 2 wound on a probe element having a core comprising a central member 77 provided with flange members 81, 82 and 83 forming a single magnetic structure therewith. The mandrel and flange members are made of a suitable magnetic material, and may be laminated. They are preferably of cylindrical shape.

The coils 1 and 2 are wound co-axially and longitudinally of each other around the mandrel 77 in the slots between flanges 81—82 and 82—83, respectively, and may each comprise a desired number of turns, such as from 100 to 5,000, of an insulated wire.

One end of the core structure is held in suitable engagement with the end of a flexible cable 89, made of rubber or other insulating material, and containing a suitable number of electrical conductors.

The coils 1 and 2 are connected to each other and preferably grounded at their connecting ends, for example, by soldering or otherwise electrically connecting them to the mandrel 77, which is in turn connected at 29 to the grounded conductor 40 in the cable. The other ends of coils 1 and 2 are connected to the other conductors in cable 89, bringing them respectively to points 7 and 9 of the diagram of Fig. 1. It is generally preferred to wind the coils 1 and 2 in series opposition.

The whole probe may be further protected from damage by surrounding it with a relatively thin layer 86 of a protective material.

When such a probe is inserted into the tube under test and an alternating current is delivered to the coils 1 and 2, the magnetic flux linking said coils will pass through the walls of the tube inducing therein eddy currents which react back on the coils 1 and 2, and thus modify the impedance value of said coils. The walls of the tube also exert a loading effect on the coils similar to that exerted by a shorted turn of a transformer winding. The measuring bridge of Fig. 1 is adjusted to a state of vectorial balance under these conditions by a proper manipulation of the variable resistance 11 and a proper condenser selection or adjustment as will be pointed out hereinbelow. This adjustment is preferably effected so as to leave the removable plate of the variable condenser 15, mechanically linked to the recorder pen system, in a position wherein said condenser is approximately at a mid-point of its adjustable range, and the recording pen 53 bears approximately against the center line of chart 61.

When the probe element is moved through normal portions of the tube under test, that is, portions free of flaws and having a uniform wall-thickness, the magnetic field surrounding coils 1 and 2 is likewise substantially constant. When, however, the probe element passes into a tube portion having a defect or a variation in the cross-section of its wall, the resulting field disturbance reacts on the probing coils and causes the measuring bridge to become unbalanced.

An unbalance voltage appearing across points 29 and 31 of the bridge is transmitted to the rebalancing unit 37, and is utilized, by means of the amplifier, discriminator and motor circuits thereof, to move the member 55 so as to actuate the movable element of the variable condenser 15 in such a manner as to restore the balance of the measuring bridge.

The coils 1 and 2 are shown in Fig. 2 as consisting of unequal numbers of turns of wire of unequal diameter to indicate diagrammatically on the drawing that, in accordance with the primary purpose of this invention, coils 1 and 2 have different or unbalanced electrical characteristics.

The object of providing the present system with an unbalanced probe element can be best explained with reference to Figs. 3, 4 and 5.

Figure 3:
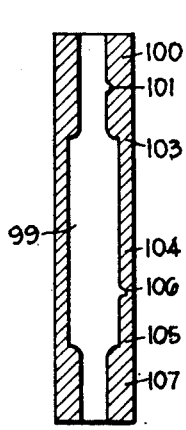
Figs. 3, 4 and 5 are, respectively, views of a tubular member such as may be tested according to the present invention, and of records obtained by magnetically testing said tubular member.

Fig. 3 shows an idealized cross-section of a metallic tubular member 99 made of any desired magnetic or non-magnetic material with walls of a standard or normal thickness such as shown at 100 and 107, having a pit or other flaw as shown at 101. Member 99 has also a portion wherein its walls have a reduced thickness, as shown at 104 between points 103 and 105, and a pit 106 in said reduced portion.

Figure 4:
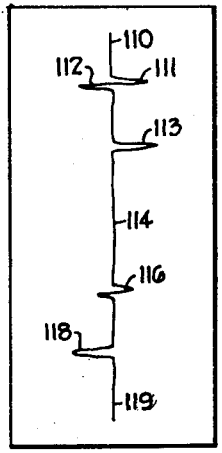

Fig. 4 shows the record of a magnetic test of this member by means of a system substantially similar to that of Fig. 1, but having balanced probe coils 1 and 2, that is, coils having in air or tubing substantially equal impedances Z, reactances X, and resistances R which satisfy, in the case of either coil, the vectorial equation:

$$Z = \pm\sqrt{R^2 + X^2}$$

When such a balanced probe is passed through the tubular member 99 of Fig. 3, the pen 53, responsive to the motion of the member 55, will trace, as explained above, a substantially centrally located record line 110 for the normal, defect-free portions of the tube 99. The pen will further indicate a deflection 111 when one of the coils passes over a pit 101, and a deflection in the opposite direction, as shown at 112, when the other coil passes over said pit.

Likewise, when the probe passes over the area 104, wherein the walls of the tubular member have a reduced thickness, the pen will indicate a deflection 113 as coil 1 passes over shoulder 103, where said area begins, with a return to center line as coil 2 also enters the reduced area, and a deflection 118 at shoulder 105 where said area ends. The pit 106 will be indicated by a deflection 116.

It will however be seen that, due to the substantially matched electrical characteristics of the coils 1 and 2, the measuring bridge of Fig. 1 readjusts itself, for the reduced-thickness area 104 between points 103 and 105, to substantially the same equilibrium or balance as for the normal thickness portions 100 or 107 of the tubular member, with the result that the record trace 114 for this area lies on substantially the same central line as traces 110 and 119 corresponding to the normal tube wall thickness.

Thus, from the record of Fig. 4, the operator is unable to obtain any indication, even qualitative, as to the extent to which the thickness of the wall in the area 104 has been reduced.

It is obvious that a similar situation obtains when the probe passes a portion of a tube where the walls have an increased thickness, as at flanges, baffle plates, etc.

According to the present invention, the probe is therefore wound with coils 1 and 2 of different electrical characteristics, in such a manner that any change in the nature or condition of the medium surrounding the two coils, e. g. a change in the thickness of the metallic tube material, causes the measuring bridge to rebalance itself to a point of equilibrium different from that at which it had been previously balanced. More specifically the present probe is constructed in such manner that the effective resistance or inductive reactances, or both, of the two coils have unequal values when both said coils are placed in a predetermined surrounding medium, such as air.

Figure 9:
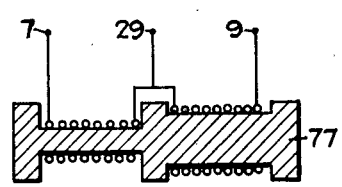
Figure 10:
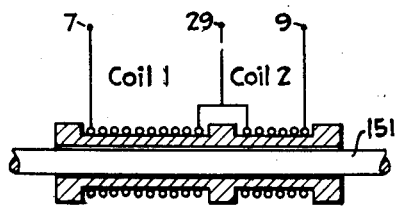
Figs. 10 and 11 are diagrammatic views of further embodiments of the probe of Fig. 2.
Figure 11:
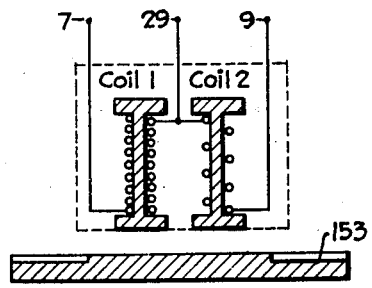

This result may be achieved in a number of different ways, for example, by varying the coil factor or the core factor, or both, of a probe element such as shown in Figs. 2, 10 or 11, as will be readily understood by those familiar with electrical arts. Figs. 6, 7, 8 and 9 illustrate, in terms of electrical symbols, some of the variations possible in this regard.

Figure 6:
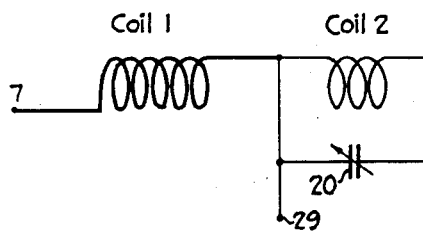
Figs. 6 and 7 are diagrams of probe coils wound according to the present invention.

As shown in Fig. 6, the coils 1 and 2 may be wound of wires of different gage or of different alloys, giving them different effective resistances. It has been found that under conditions such as obtained in magnetic testing, coils wound of wire of different gage will also differ from each other in inductive reactance, even when having the same number of turns, due to the variation in the degree of closeness with which said wires of different gage overlie the core on which they are wound. The values of the inductive reactance of the two coils may be further made different from each other by using unequal number of turns for each coil, as also shown in Fig. 6.

Figure 7:
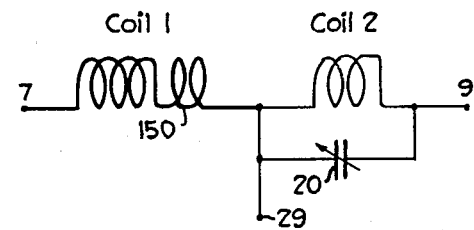

The coils may likewise be wound of wires of different gage in such a manner that one of them, for example coil 1, has a portion of its winding reversed, as shown at 150 in Fig. 7, thereby further varying its total effective reactance and resistance as compared with that of coil 2.

Coils having different resistance, reactance and impedance characteristics may be further obtained by combining any of the above coil factor variations with suitable core factor variations, that is, by winding said coils on cores having unbalanced magnetic properties.

Figure 8:
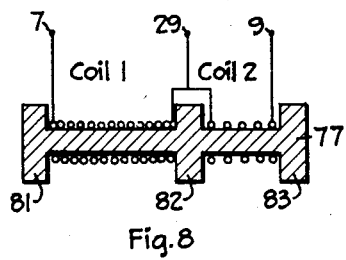
Figs. 8 and 9 are diagrams of different types of cores suitable for the probe of the present invention.

Thus, the core on which the coils are wound may be formed with coil slots having an unequal axial length, as shown in Fig. 8, or an unequal diameter, as shown in Fig. 9, or both. The magnetic properties of the core may further be made to vary with regard to the two coils wound thereon by subjecting the core, or a part or end thereof, to a suitable processing such as a pressure, shock or heat treatment, which distorts the natural magnetic properties of said core.

Since, however, the balancing range of adjustment of the system of Fig. 1 is relatively narrow, it is desirable, according to the present invention, to select the effective resistances and reactances of the two coils so that the impedances thereof, although different in air, become approximately equal or balanced when the probe is introduced into a defect-free, uniform diameter portion of a tube of the type which it is desired to test.

Since, the impedances of the two coils are vectorial quantities, it is possible to maintain a vectorial balance therebetween by connecting a condenser 20, preferably a variable condenser of the decade type, across the coil having the smaller effective resistance, thereby making the vectorial impedance triangles of the two coils substantially similar, if not necessarily equal, for the desired conditions.

Thus, when the probe of the present invention is balanced in the bridge of Fig. 1 for certain predetermined conditions of the surrounding medium, for example, with the probe in a defect-free, uniform wall-thickness portion of a tube, and these conditions are then changed, as by moving the probe to a portion of the tube where the walls have an increased or a decreased wall thickness, the effective resistance and the effective reactance of both coils are affected by said change of the surrounding medium in such a manner as to upset the balance of the measuring bridge of Fig. 1 and to cause said bridge to establish a new balance point by automatically resetting the adjustable condenser 15.

As an illustration, when a probe such as shown in Fig. 2, wherein the effective resistance $R_1$ of coil 1 is not equal to the effective resistance $R_2$ of coil 2 for air, and the effective reactance $X_1$ is not equal to the effective reactance $X_2$ for air, is introduced into a tubular member such as 99, made of a non-magnetic metal such as brass, the flow of the energizing current through the coils will create eddy currents in the walls of the tube 99. These eddy currents derive their energy from the field of the probe, and their effect is thus to increase the value of the effective resistance of the coils as compared with that obtaining when the probe was surrounded by air. The eddy currents furthermore tend to set up magnetic fields opposing the fields of the coils, and their effect is thus to decrease the value of the effective inductive reactance of the coils as compared with that obtaining when the probe was surrounded by air.

It may be shown that the change of the effective resistance of a coil under these circumstances can be approximated by the expression:

$$\Delta R = \frac{3}{r\pi} T^2 A^2 \frac{p}{tr^4} \quad (1)$$

wherein:

$\Delta R$ is the change in effective coil resistance
$T$ is the number of turns
$A$ is the cross-section area of the coil
$p$ is the resistivity of the tubular member
$t$ is its wall thickness and
$r$ is its radius.

It may likewise be shown that the change of the effective reactance of a coil under the same conditions can be approximated by the expression:

$$\Delta X = -X_0 \left( \frac{2}{3} \frac{Vc}{Vs} \cdot \frac{a}{k} \right) \quad (2)$$

wherein:

$\Delta X$ is the change in effective coil reactance
$X_0$ is the coil reactance in air
$Vc$ is the volume of the coil
$Vs$ is the volume of the walls of the tubular member surrounding the coil
$a$ is a factor depending on the frequency of the energizing current and on the dimensions, permeability and resistivity of the material of the tubular member
$k$ is a constant which depends on the size of the coil and has generally a value smaller than 1.

Thus, the effective resistance of a coil, when introduced into a tubular member may be expressed as $$R_{tube} = R_{air} + \Delta R$$

Similarly, the effective reactance of this coil when introduced into the same tube may be expressed as $$X_{tube} = X_{air} - \Delta X$$

It is obvious from the Equations 1 and 2 that, for the present probe, $\Delta R_1$ is not equal to $\Delta R_2$, and $-\Delta X_1$ is not equal to $-\Delta X_2$, since these values are functions of the coil windings, which are not equal.

The factor causing the change in the value of $\Delta R$ is $t$, the thickness of the walls of the tubular member. Since $\Delta R_1$ is not equal to $\Delta R_2$, a specific per cent change in the value of $t$ will not give proportional changes in the values of the effective resistances of the two coils when moved from one portion of the tube to another portion having a different wall thickness.

The factor causing the change in the value of $\Delta R$ is $Vs$, the volume of the walls of the tubular member surrounding the coil. As above, a specific per cent change in the value of $Vs$ will not cause proportional changes in the effective reactances of the two coils when the robe is moved to a portion of a tube having a different wall thickness.

The balance between the impedances of the coils will thus be upset under the new conditions, and the bridge circuit of Fig. 1 will tend to readjust itself to these conditions by changing the setting of the movable plate of the balancing condenser 15, which in turn results in offsetting the recording pen 53 to a new position.

Figure 5:
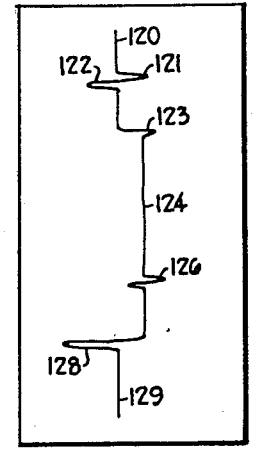

Thus, referring to Fig. 5, showing a record of test of tube 99 by the probe of the present invention, it will be seen that pen deflections similar to those of the record of Fig. 4 occur at 121—122, 123 and 128, when first one coil, and then the other pass over points 101, 103 and 105 corresponding to changes in the thickness of the walls of the tube. However, after both coils have passed into the area 104 of the tube, it will be seen that, in spite of the uniform thickness of the walls of the tube in said area, the difference in the thickness of the walls of the tube in said area 104 compared with that in the areas 100 and 107 causes the bridge circuit of Fig. 1 to rebalance itself to an equilibrium condition different from that obtaining in the portions 100 and 107 of the tube having a normal wall thickness, with the result that the record line 124, corresponding to the area 104, is offset with regard to lines 120 or 129, corresponding to areas of normal wall thickness.

A record such as obtained by means of the present probe thus provides the operator with ready means for differentiating between tube portions merely having individual pits or flaws on the walls thereof, and tube portions wherein whole areas are of reduced wall thickness. By a proper calibration of the measuring circuit of Fig. 1, the extent to which the walls of the tubular member have been reduced in thickness can furthermore be determined from the record obtained.

Since records obtained by means of the present system indicate in a similar manner, that is, by a line offset in the opposite direction, those portions of a tube wherein its walls have an increased thickness, as in the case of flanges, baffle plates, etc., which may be either affixed to the tube or form an integral part therewith, such records are furthermore useful in permitting a ready determination of the exact location of any individual pit, crack or flaw from the record by reference to the location of such thickened tube portions, on said record, the actual location of said thickened portions on the pipe being well known or easily measurable.

Although the present invention has been described for simplicity with regard to the embodiments shown in Figs. 1 and 2, it is understood that the balancing bridge system, the recording system and the probe can be modified in various desired ways without departing from the spirit of the invention.

For example, the probe coil structure shown in Fig. 2 may be modified in any suitable manner in accordance with desired testing purposes. Thus, by enlarging the diameters of the present coils, these coils may be used to test, for flaws and size variations, such metallic members as pipes, rods, etc., which are passed inside said coils, as shown at 151 in Fig. 10. The probe structure may be further modified, as diagrammatically shown in Fig. 11, to test flat metallic member 153 such as rails, plates, etc.

I claim as my invention:

1. For use with a measuring bridge circuit, a probing device comprising a core of magnetic material adapted for insertion and movement in a passageway in a metallic object to be tested, and two longitudinally spaced co-axial coil means wound on said core, each of said coil means having a different number of turns.

2. For use with a measuring bridge circuit, a probing device comprising a core of magnetic material adapted for insertion and movement in a passageway in a metallic object to be tested, and two longitudinally spaced co-axial coil means wound on said core, each of said coil means being wound with a different number of turns of a wire of a different gage.

3. For use with a measuring bridge circuit, a probing device comprising a core of magnetic material adapted for insertion and movement in a passageway in a metallic object to be tested, and two longitudinally spaced co-axial coil means wound on said core, each of said coil means being wound with a different number of turns of a wire having a different resistivity.

4. For use with a measuring bridge circuit, a probing device comprising a core of a magnetic material adapted for insertion and movement in a passageway in a metallic object to be tested, and two longitudinally spaced co-axial coil means wound on said core, said coil means having coil factors of predetermined appreciably different magnitudes.

5. For use with a measuring bridge circuit, a probing device adapted for movement adjacent a metallic body to be tested, said probing device comprising a core of magnetic material and two longitudinally spaced co-axial coil means wound on said core, said coil means having predetermined appreciably different coil factors selected so that the impedances of said coil means have different values in air and approximately equal values when placed immediately adjacent to a defect-free portion of said metallic body.

6. For use in a measuring bridge circuit, a probing device comprising a core of magnetic material adapted for insertion and movement in a passageway in a metallic object to be tested, and two longitudinally spaced co-axial coil means wound on said core, each of said coil means being formed with a wire of a different gage and having an effective resistance appreciably different from that of the other coil means.

7. For use in a measuring bridge circuit, a probing device comprising a core of magnetic material adapted for insertion and movement in a passageway in a metallic object to be tested, and two longitudinally spaced co-axial coil means wound on said core, a portion of at least one of said coil means being wound in a direction opposite from that of the other portion of said coil.

8. For use in a measuring bridge circuit, a probing device comprising a core of magnetic material adapted for insertion and movement in a passageway in a metallic object to be tested, and two longitudinally spaced co-axial coil means wound on said core, each of said coil means being formed with a wire made of a different alloy and having an effective resistance appreciably different from that of the other coil means.

9. For use with a measuring bridge circuit, a probing device comprising a core of a magnetic material adapted for movement adjacent a metallic body to be tested, and two longitudinally spaced co-axial coil means wound on said core, said coil means having coil factors of predetermined appreciably different magnitudes.

10. For use with a measuring bridge circuit, a probing device comprising a core of a magnetic material adapted for movement adjacent a metallic body to be tested, and two longitudinally spaced co-axial coil means wound on two longitudinally spaced portions of said core, said two core portions having core factors of predetermined appreciably different magnitudes.

MARION V. LONG.

REFERENCES CITED

The following references are of record in the file of this patent:

UNITED STATES PATENTS

| Number | Name | Date |
|---|---|---|
| 2,104,646 | Greenslade | Jan. 4, 1938 |
| 2,124,577 | Knerr | July 26, 1938 |
| 2,215,805 | Wills | Sept. 24, 1940 |
| 2,346,830 | De Lanty | Apr. 18, 1944 |